United States Patent [11] 3,630,782

[72] Inventor Edwin K. Butler, deceased, late of
 St. Petersburg, Fla, by Adrina Neil Butler,
 beneficiary of the estate, 6762 17th St.,
 South St. Petersburg, Fla. 33712
[21] Appl. No. 865,429
[22] Filed Oct. 10, 1969
[45] Patented Dec. 28, 1971

[54] SEA WATER BATTERY COMPRISING A CAPACITOR WITHIN THE BATTERY ELECTROLYTE PORT AND A METHOD OF MINIMIZING INTERCELL SHORT CIRCUITS
 8 Claims, 3 Drawing Figs.
[52] U.S. Cl .................................................... 136/100,
 136/166
[51] Int. Cl. .................................................... H01m 17/00
[50] Field of Search............................................ 136/100,
 112–114, 90, 91, 161, 166, 181; 317/230, 231,
 232, 233

[56] References Cited
UNITED STATES PATENTS
3,050,665 8/1962 Hurd ............................. 317/231
3,431,148 3/1969 Jones............................. 136/90
3,427,201 2/1969 Burant et al. .................. 136/100

*Primary Examiner*—Anthony Skapars
*Attorney*—Burns, Doane, Swecker & Mathis

ABSTRACT: A method and apparatus for maximizing the electrical potential of primary batteries of the type immersible in an electrolyte comprising placing a foraminous capacitor within the battery electrolyte port or ports.

INVENTOR
EDWIN K. BUTLER

INVENTOR
EDWIN K. BUTLER

BY Burns, Doane, Benedict,
Swecker & Mathis
ATTORNEYS

SEA WATER BATTERY COMPRISING A CAPACITOR WITHIN THE BATTERY ELECTROLYTE PORT AND A METHOD OF MINIMIZING INTERCELL SHORT CIRCUITS

BACKGROUND OF THE INVENTION

This invention relates to deferred action primary batteries of the type which may be stored in an inactive condition indefinitely and brought to life by immersion in an electrolyte such as, for example, se water. Batteries of this type have been useful in the past to supply energy for proximity fuses, emergency signaling devices, sonobuoys and the like.

More specifically, the invention relates to a method and apparatus for minimizing intercell short circuits in se water batteries and therefore maximizing the effective battery potential and life.

Sea water batteries are conventionally constructed with a generally rectangular casing surrounding a plurality of individual electrochemical cells. Each cell comprises an anode sheet composed, for example, of magnesium or zinc and a cathode sheet composed, for example, of silver chloride or copper. The anodes and cathodes are juxtaposed to each other in generally parallel planes which are electrically isolated from each other by a suitably member. Individual cells are separated by fluid-impervious partitions, which may also be electrically conductive so as to electrically connect in series an anode of one cell with a cathode of an adjacent cell thus forming a battery bank. An electrical lead is connected to an anode at one end of the bank of cells and another lead is connected to a cathode at the opposite end of the bank of the cells for ready connection to an external load.

One or more openings are provided in the lateral sides of the battery casing thus exposing at least a portion of the edges of each of the cells. Therefore, when the batteries are immersed in an electrolyte, such as sea water, all of the cells will be simultaneously activated as the sea water flows into the casing.

Within each electrochemical cell an oxidation reaction will occur at the anode which may be summarized for a typical anode material as follows:

a. At the anode: $mg. + 2H_2O \rightarrow Mg(OH)_2 + 2H^+ + 2e^-$. Thus it will be seen that positive ions will be liberated into the electrolyte and electrons will be available to flow through an external load. A corresponding reduction reaction will occur at the cathode which may be summarized for a typical cathode material as follows:

b. At the cathode: $H^+ + AgCl \rightarrow HCl + AG - e^-$.

It will be seen that the reduction reaction utilizes ions which migrate through the electrolyte and electrons drawn through the external load. Thus, as the electrochemical cells spontaneously discharge, electrons flow through an external circuit from anode to cathode.

The electromotive force of each cell is determined by the electromotive potential of the anode and cathode materials making up the plates. Since this value is frequently less than that necessary to meet the demands of conventional equipment, a plurality of cells may be placed within a single casing and arranged in series, as previously mentioned, with the anode of one cell electrically connected to the cathode of the next adjacent cell to establish a battery bank with a potential which will be approximately equal to the sum of the potentials of the individual cells.

A vexatious problem, however, with batteries of the type previously discussed exists at the electrolyte ports. In this regard, the cathode of one cell, as previously mentioned, may be electrically connected by a fluid impervious conductive partition to the anode of an adjacent cell. Thus, there is a ready path for electrons to flow from cell to cell but essentially no path for intercell ion flow. At each port, however, there exists an area of fluid communication between cells which presents a potential avenue for intercell hydrogen ion flow. If such a flow is permitted to progress a closed circuit is established between the anode and cathode of adjacent cells. Such a circuit induces electron flow to bypass the load and the cells will be consumed without producing a corresponding useful electrical potential.

When a plurality of bands are combined in series to form a battery, it will readily be appreciated that the same problem of interbank short circuits may develop.

In the past several techniques have been utilized with varying degrees of success to minimize this intercell and interbank deleterious effect. These techniques, however, proceed on the principle of minimizing the flow of the electrolyte through the battery. At least one disadvantage of these previously known cells turns upon the requirement of $H_2O$ at the anode for the oxidation reaction to proceed. In this connection a compromise is necessary between supplying the necessary $H_2O$ for the oxidation reaction while simultaneously limiting the flow of the electrolyte to minimize intercell and interbank short circuits.

SUMMARY OF THE INVENTION

Objects of the Invention

To this and other ends it is therefore a general object of the invention to overcome the problems and disadvantageous of the type previously described.

It is a particular object of the invention to provide a method and apparatus for maximizing battery effective voltages.

It is another object of the invention to provide a method and apparatus for minimizing intercell and interbank short circuits in batteries.

It is still another object of the invention to provide a method and apparatus for minimizing intercell and interbank short circuits in sea water batteries while simultaneously maintaining a free flow path for an electrolyte through the battery.

It is a further object of the invention to provide a method and apparatus for readily equipping existing sea water batteries for minimizing intercell and/or interbank short circuits while maintaining a free flow path for an electrolyte through the battery.

Preferred Embodiment and Theory of Operation

One preferred form of the invention intended to accomplish at least some of the foregoing objects comprises placing a foraminous capacitor across the electrolyte ports of the sea water battery cells. The capacitor may be composed of an inner conductive foraminous plate; a foraminous dielectric contiguously abutted against the inner capacitor plate; and an outer foraminous conductive plate abutted against the dielectric to form a capacitor having a plurality of apertures therethrough.

As a battery is immersed in an electrolyte, the electrochemical half reactions at the anode and cathode, as previously mentioned, will spontaneously progress. These half reactions liberate hydrogen ions ($H^+$) into the electrolyte solutions, some of which may drift with the electrolyte flow through the battery toward the electrolyte ports in the battery casing.

A hydrogen ion comprises a positive proton and a neutron with no electron in the first electron shell. Therefore a hydrogen ion will have a high affinity for the electron. The capacitor plates, however, are composed of, for example, Cu atoms which have a single electron in their outer fourth shell. Thus, the Cu atoms have a relatively low affinity for their outer fourth shell electron. It will therefore be appreciated that when the hydrogen ion, carried by the electrolyte, approaches the inner shield of the capacitor, an electron may be captured from the outer shell of the Cu atom by the hydrogen ion. A series of such hydrogen ion captures will deplete the inner capacitor sheet of a number of electrons and render it positive with respect to the outer capacitor plate. The outer plate, however, is unable to replenish the inner plate electron deficiency because the dielectric therebetween prevents substantial electron flow. Thus a charged capacitor is established within each electrolyte port, which will serve to repel further hydrogen ion flow toward it. Having thus minimized the intercell hydrogen ion flow, intercell short circuits will essentially be eliminated and the useful battery voltage and life will be maximized.

THE DRAWINGS

Further objects and advantages of the invention will become apparent from the following detailed description taken in conjunction with the accompanying drawings, wherein.

DESCRIPTION OF THE PREFERRED EMBODIMENTS

Figure 1:
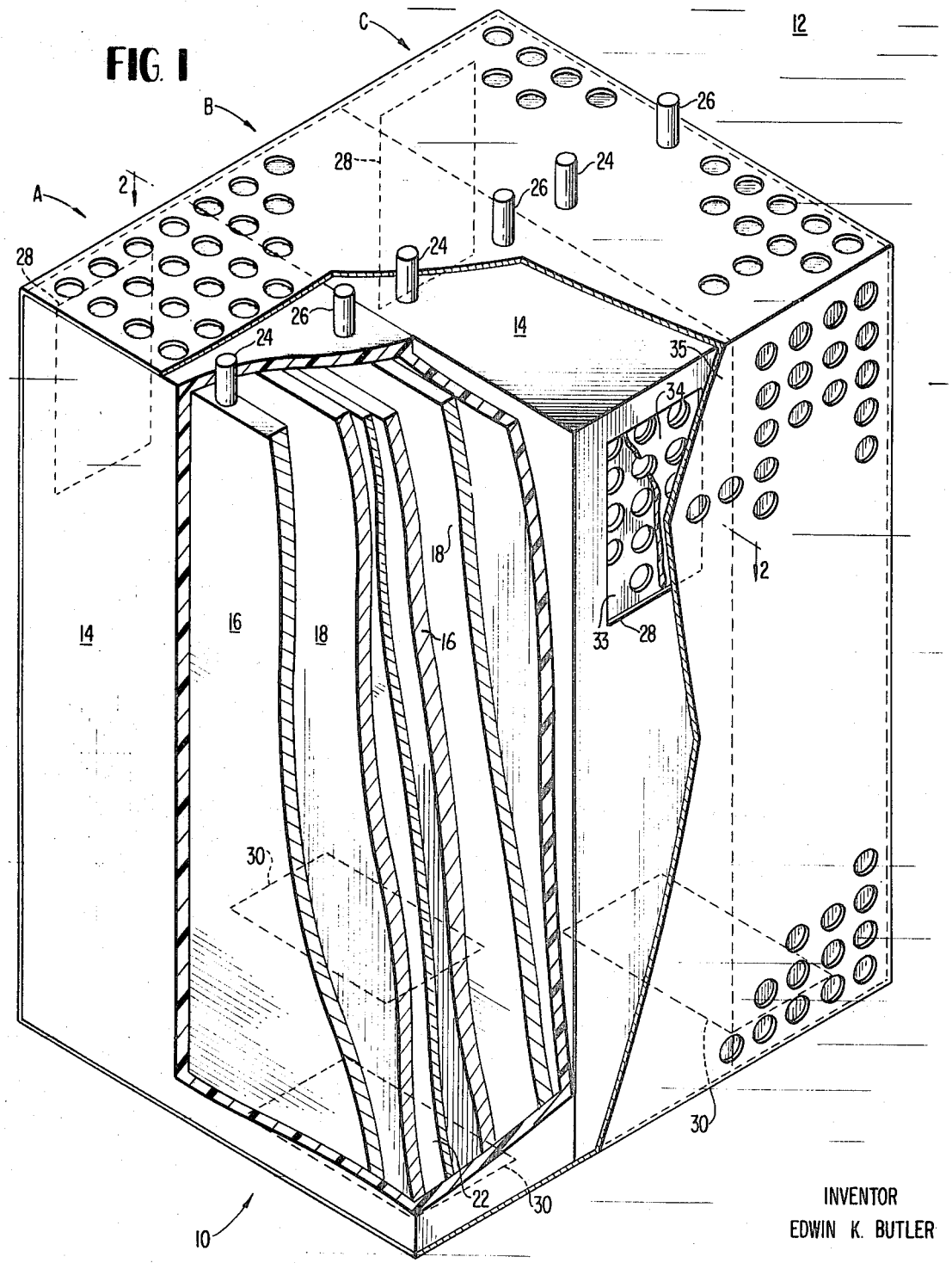
FIG. 1 is an isometric view of a preferred embodiment of the instant invention having one corner thereof removed to disclose the interior plates of one bank of electrochemical cells.

Referring now to the drawings where like numerals designate like parts, and more specifically to FIG. 1, a sea water battery 10 is disclosed immersed in a body of water such as a sea or an ocean 12.

Figure 2:
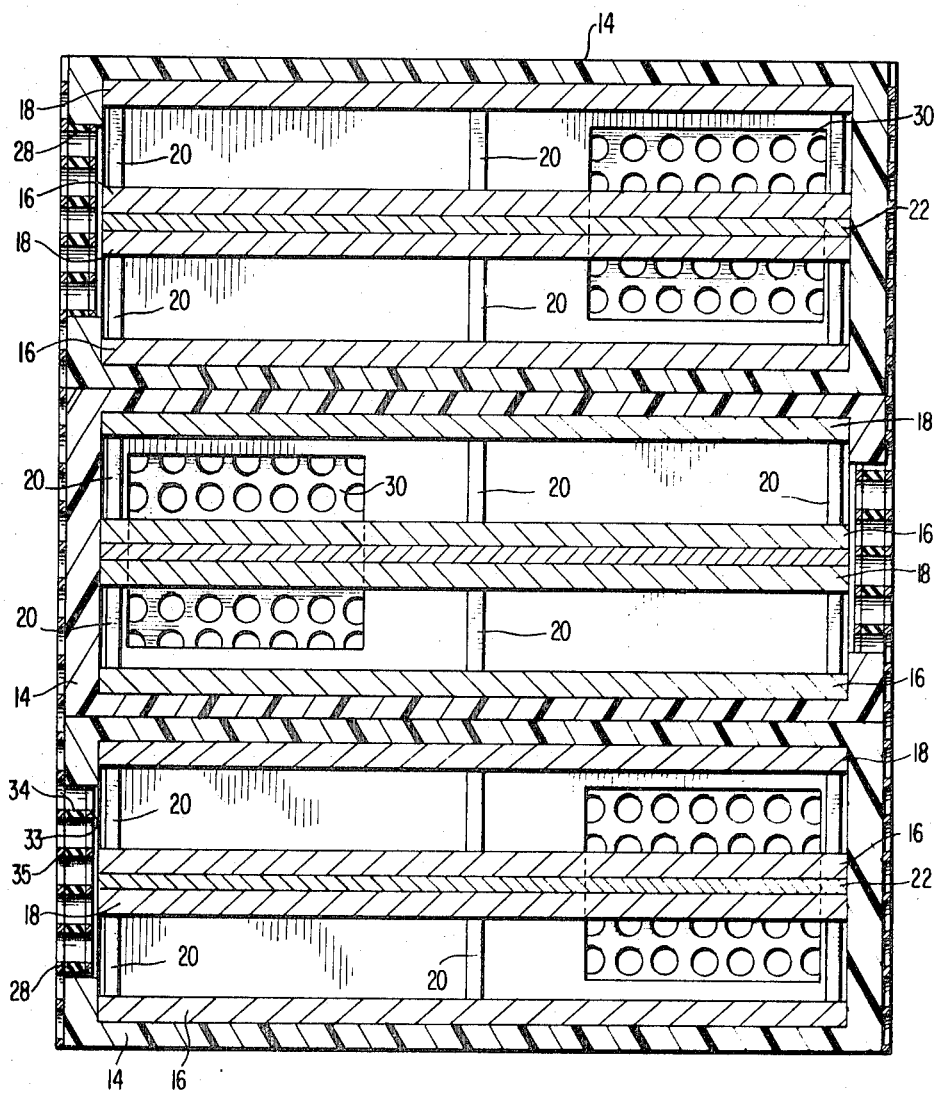
FIG. 2 is a cross-sectional view taken along section line 2—2 of FIG. 1, and shows a foraminous capacitor in each of the electrolyte ports.

The battery may be formed from a plurality of individual cell banks such as A, B and C. Each individual cell bank comprises an outer dielectric shell 14 which may be fashioned in the form of a generally closed rectangular box. Positioned within each individual bank may be a plurality of individual electrochemical cells which are formed from an anode 16 which may be composed of, for example, magnesium or zinc, and a cathode 18 which may be composed of, for example, silver chloride or copper. The anode and cathode are formed into generally rectangular planar sheets which are electrically separated from each other by engagement with the inner periphery of the outer casing 14, or by dielectric spacer blocks 20, as best seen in FIG. 2. For ease of illustration, the anode and cathode have been depicted as being substantially spaced from one another. However, in actual practice, there materials may be formed from relatively thin sheets and closely juxtaposed to one another.

Extending between the first anode and cathode comprising an electrochemical cell and a second anode and cathode comprising a second cell within each casing is an electrically conductive and fluid impervious membrane or partition 22. Such a partition serves to fluidically isolate individual cells, but electrically connect the cathode of one cell with the anode of an adjacent cell. Therefore, the cells are electrically connected in series and will be additive in regard to voltage while maintaining the same current flow.

A plurality of these individual electrochemical cells connected in series comprise a bank, and a lead 24 may be connected to an anode 16 at one end of the bank of cells and a second lead 26 may be connected to a cathode 18 at the opposite end of the bank of cells. These leads may be connected directly to an external load, not shown, or connected with a plurality of other battery banks, such as A, B and C, shown in FIGS. 1 and 2 in series or parallel as desired. The plurality of battery banks then may be connected to an external load, also not shown. It should be appreciated that, while only two cells have been shown within each battery bank, in actual practice a greater number of individual cells may be combined within each bank as desired, or as the load requirements dictate.

In order to activate the primary electrochemical cells, at least one port 28 is fashioned through the shell 14 in each bank. This port permits the ingress and egress of an electrolyte solution, such as sea water, into the battery between the anode and cathode plates. The sea water electrolyte provides a source of $H_2O$ for the oxidation reaction and further serves as an ion carrier. In order to facilitate electrolyte flow through the individual battery banks, a second fluid port 30 is often fashioned therein in a posture remotely disposed from the first port 28, so that there will essentially be a through flow path established through the cells.

When a number of individual banks are combined to form a battery, such as depicted in FIGS. 1 and 2, the ports of adjacent banks are staggered so as to offset the openings to the electrolyte between banks and therefore interbank ion drift is minimized. In order to further minimize interbank ion drift and also intercell ion drift, a capacitor having a plurality of apertures therethrough may be positioned within each electrolyte port.

The capacitors comprise an inner plate 33, an intermediate dielectric 34 and an outer plate 35. The plates may be formed from conventional metals such as, for example, copper and the dielectric may be formed from a suitable nonconductive material such as, for example, Mylar.

In order to establish an electrical potential between the capacitor plates, a small battery, not shown, may be attached to the outer battery casing by a conventional bracket, with leads running to the inner and outer capacitor plates, or the inner and outer capacitor plates may be connected to the leads of the battery itself, or preferably, as previously discussed, no connection need be made at all. In this connection, materials may be selected, such as copper, which will readily give up an electron to a hydrogen ion, and therefore, the inner capacitor plate 33 will become automatically charged, as previously discussed.

In those instances where a number of individual banks are to be connected together, such as shown in FIGS. 1 and 2, the outer capacitor plate may comprise a common sheet having a plurality of holes therethrough. It will be readily realized that this sheet will not only serve as a capacitor plate, but also as a structural member which serves to reinforce and connect the individual banks together.

Figure 3:
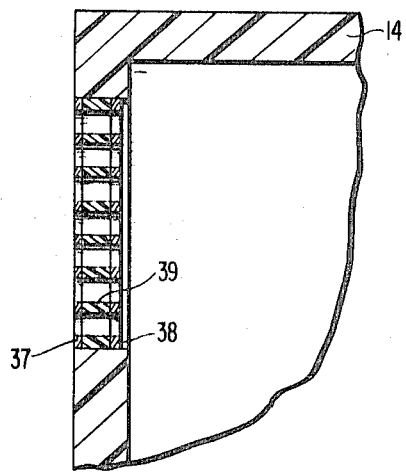
FIG. 3 is an alternate embodiment of the invention shown in cross section and comprises an individual foraminous capacitor dimensioned to compatibly engage with the inner periphery of a battery electrolyte port.

An alternate embodiment of the invention and one which may be readily adapted for use with conventional sea water batteries is a capacitor plug, as shown in FIG. 3. This form of the invention comprises an outer foraminous plate 37, and an inner foraminous plate 38 having a suitable foraminous dielectric 39 sandwiched therebetween. The capacitors may be exteriorly dimensioned to compatibly engage in interfering fashion with the electrolyte ports of conventional sea water batteries or may be attached by conventional struts or fasteners, not shown.

It will be appreciated by those skilled in the art that the above disclosure provides a means and apparatus for effectively minimizing interbank ion flow and intercell ion flow which will thus minimize short circuits in sea water batteries while maintaining the electrolyte flow therethrough.

Further, the provision of foraminous capacitors within or next to the electrolyte ports may be accomplished economically, and easily adapted to existing sea water batteries. Proper selection of capacitor plates enables the capacitor to build up a potential sufficient to prevent ion flow therethrough without the necessity for external power sources or detracting from the potential generated within the electrochemical cells.

Although the invention is described with reference to preferred embodiments, it will be appreciated by those skilled in the art that additions, deletions, modifications, substitutions and other changes not specifically described and illustrated in these embodiment, may be made which will fall within the purview of the invention.

What is claimed is:

1. A sea water battery comprising:
   a casing;
   at least two anodes positioned within said casing;
   at least two cathodes positioned within said casing, said anodes and said cathodes being alternately disposed in pairs within said casing;
   at least one fluid impervious partition positioned within said casing between said anode and cathode pairs to isolate each of said pairs from one another;

an electrical connection through said partition connecting an anode of one pair with a cathode of an adjacent pair, thus establishing a series electrical connection between said pairs;

said casing having at least a first electrolyte port therein providing fluid communication with all of said pairs;

a foraminous capacitor positioned within each electrolyte port; and two electrical leads one connected to each of the remote anode or cathode elements for ready connection to an external load.

2. A sea water battery as defined in claim 1 and further wherein said casing is provided with:

at least a second electrolyte port therein providing fluid communication with all of said pairs, and being positioned remotely from said at least a first electrolyte port, whereby when said sea water battery is immersed in an electrolyte the electrolyte may pass generally unidirectionally through said battery.

3. A sea water battery as defined in claim 2 and further comprising:

a foraminous capacitor positioned within said at least a second electrolyte port.

4. A sea water battery comprising:

a first sea water bank having a casing;

at least two anodes positioned within said casing;

at least two cathodes positioned within said casing, said anodes and said cathode being alternately disposed in pairs within said casing;

at least one fluid impervious partition positioned within said casing between said anode and cathode pairs to isolate each pair;

an electrical connection through said partition connecting an anode of one pair with a cathode of an adjacent pair, thus establishing a series electrical connection between said pairs;

said casing having at least a first electrolyte port therein providing fluid communication with all of said pairs;

a foraminous capacitor positioned within each electrolyte port; and two electrical leads one connected to each of the remote anode or cathode elements, a second sea water bank substantially identical with said first sea water bank and connected thereto wherein said at least one electrolyte port in said first bank being positioned remotely from said sea water port in said second bank.

5. A method of minimizing intercell short circuits in sea water batteries comprising the steps of:

electrically repelling ion drift between electrolyte ports, while simultaneously maintaining electrolyte flow through the battery.

6. A method of minimizing intercell ion drift as claimed in claim 5 wherein said step of repelling comprises:

maintaining a positive electrical potential across said electrolyte ports.

7. A method of minimizing intercell ion drift between sea water battery cells connected in series comprising the steps of:

establishing and maintaining a positive electrical potential across the electrolyte ports.

8. A method for maximizing the electrical potential of primary batteries of the type immersible in an electrolyte and having electrolyte ports therein comprising the steps of:

inserting a foraminous capacitor within said battery electrolyte ports.

* * * * *